(12) United States Patent
Schlesinger et al.

(10) Patent No.: US 9,642,497 B2
(45) Date of Patent: May 9, 2017

(54) CONTAINER FACILITATING MIXED BEVERAGE PREPARATION

(71) Applicant: Instant Cocktail LLC, Seattle, WA (US)

(72) Inventors: David Schlesinger, Seattle, WA (US); Brian Elrod, Seattle, WA (US); Duane King, Seattle, WA (US); Douglas Garrett Gibson, Seattle, WA (US); Shawn Filer, Seattle, WA (US); Stewart Kelpe, Seattle, WA (US)

(73) Assignee: Instant Cocktail LLC, Seattle, WA (US)

( * ) Notice: Subject to any disclaimer, the term of this patent is extended or adjusted under 35 U.S.C. 154(b) by 0 days.

(21) Appl. No.: 14/568,079

(22) Filed: Dec. 11, 2014

(65) Prior Publication Data

US 2016/0166115 A1    Jun. 16, 2016

(51) Int. Cl.
| | |
|---|---|
| *B01F 11/00* | (2006.01) |
| *A47J 43/27* | (2006.01) |
| *B65D 81/32* | (2006.01) |
| *B65D 81/36* | (2006.01) |
| *B65D 25/54* | (2006.01) |

(52) U.S. Cl.
CPC ............. *A47J 43/27* (2013.01); *B65D 25/54* (2013.01); *B65D 81/3205* (2013.01); *B65D 81/3216* (2013.01); *B65D 81/361* (2013.01)

(58) Field of Classification Search
CPC    B65D 51/28; B65D 81/32; F25D 3/08; F25D 2303/0842; F25D 2303/0844; A47J 43/27; A47J 31/005
USPC ......................................................... 220/568
See application file for complete search history.

(56) References Cited

U.S. PATENT DOCUMENTS

| | | | | |
|---|---|---|---|---|
| 1,725,265 | A * | 8/1929 | Glendinning ............ | A47J 43/27 206/217 |
| 1,903,312 | A * | 4/1933 | Ellis ......................... | B65D 81/32 206/499 |
| 2,374,092 | A * | 4/1945 | Glaser ...................... | A47G 19/2205 141/380 |
| 7,798,346 | B2 * | 9/2010 | Nelson ...................... | B65D 81/3205 206/501 |
| 2008/0023348 | A1* | 1/2008 | Herzog ...................... | A47G 19/2205 206/217 |
| 2013/0098784 | A1* | 4/2013 | Spendlow ............... | B65D 75/008 206/222 |

\* cited by examiner

*Primary Examiner* — Shawn M Braden
(74) *Attorney, Agent, or Firm* — Davis Wright Tremaine LLP (57) ABSTRACT

A cocktail shaker is configured to store ingredients for making a cocktail. Multiple ingredients may each be kept in their respective containers and the containers may be stored in the cocktail shaker. To make a cocktail, a person may open the shaker, access the containers of ingredients of the cocktail and use the shaker to mix the ingredients, thereby preparing the cocktail. The shaker may also be used as a glass to drink the cocktail.

16 Claims, 11 Drawing Sheets

CONTAINER FACILITATING MIXED BEVERAGE PREPARATION

CROSS REFERENCE TO RELATED APPLICATION

This application incorporates by reference for all purposes U.S. Design patent application Ser. No. 29/511,604, filed Dec. 11, 2014, titled CONTAINER FACILITATING MIXED BEVERAGE PREPARATION filed concurrently herewith.

BACKGROUND

Cocktails are enjoyed by many people around the world. Generally, cocktails comprise multiple ingredients, often including ingredients that contain alcohol. In most circumstances, to enjoy a cocktail, a person needs to either purchase a cocktail from a restaurant, bar, or other establishment that sells cocktails or make the cocktail him or herself. Relying on a restaurant, bar, or other establishment to provide a cocktail, while popular, is often expensive and inconvenient, such as when there is no such establishment nearby or at times outside of normal business hours. Self-preparation of cocktails typically requires purchasing multiple ingredients and measuring the right amounts of ingredients for a specific cocktail. This often leaves one with too much of certain ingredients, many of which are perishable.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
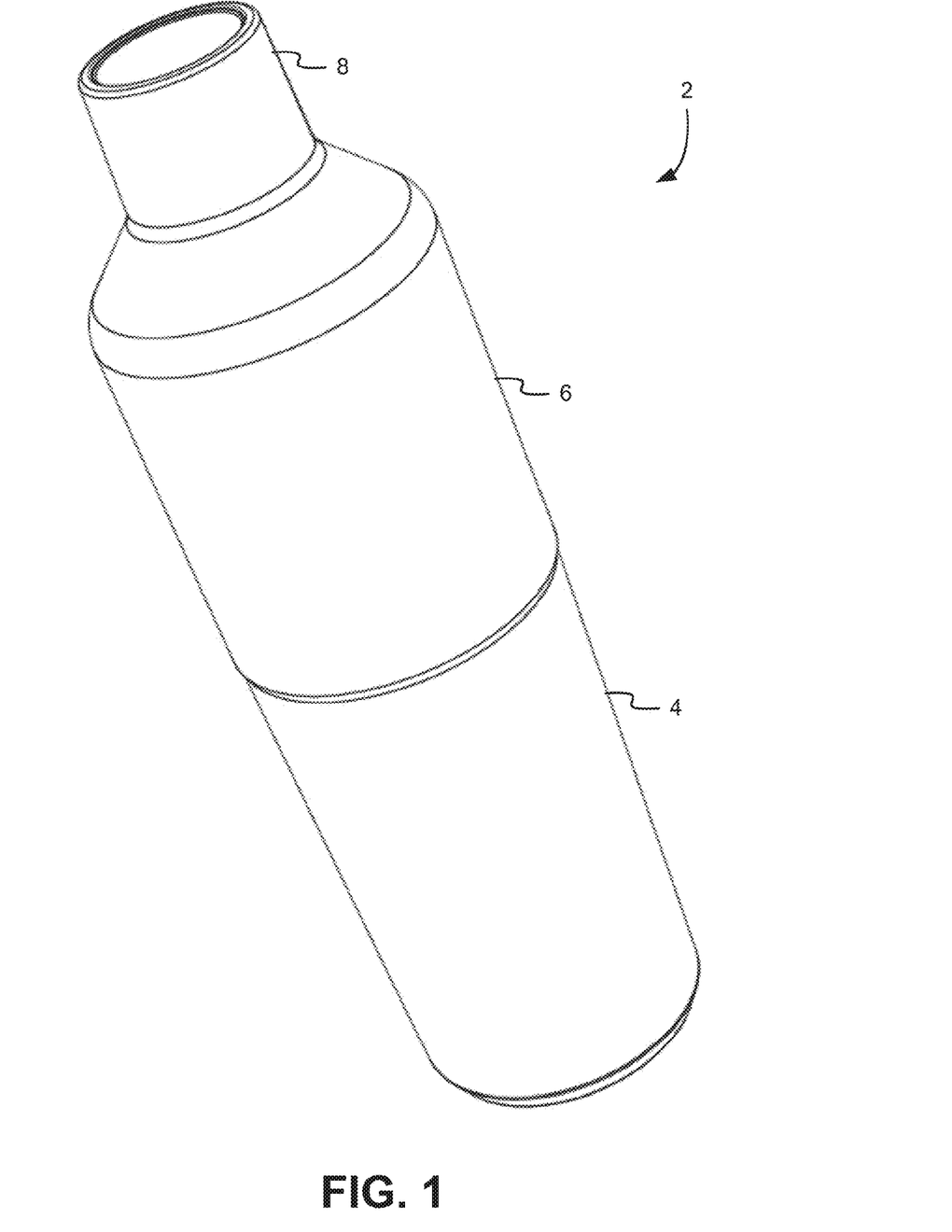
FIG. 1 shows a top perspective view of a shaker in accordance with an embodiment.
Figure 2:
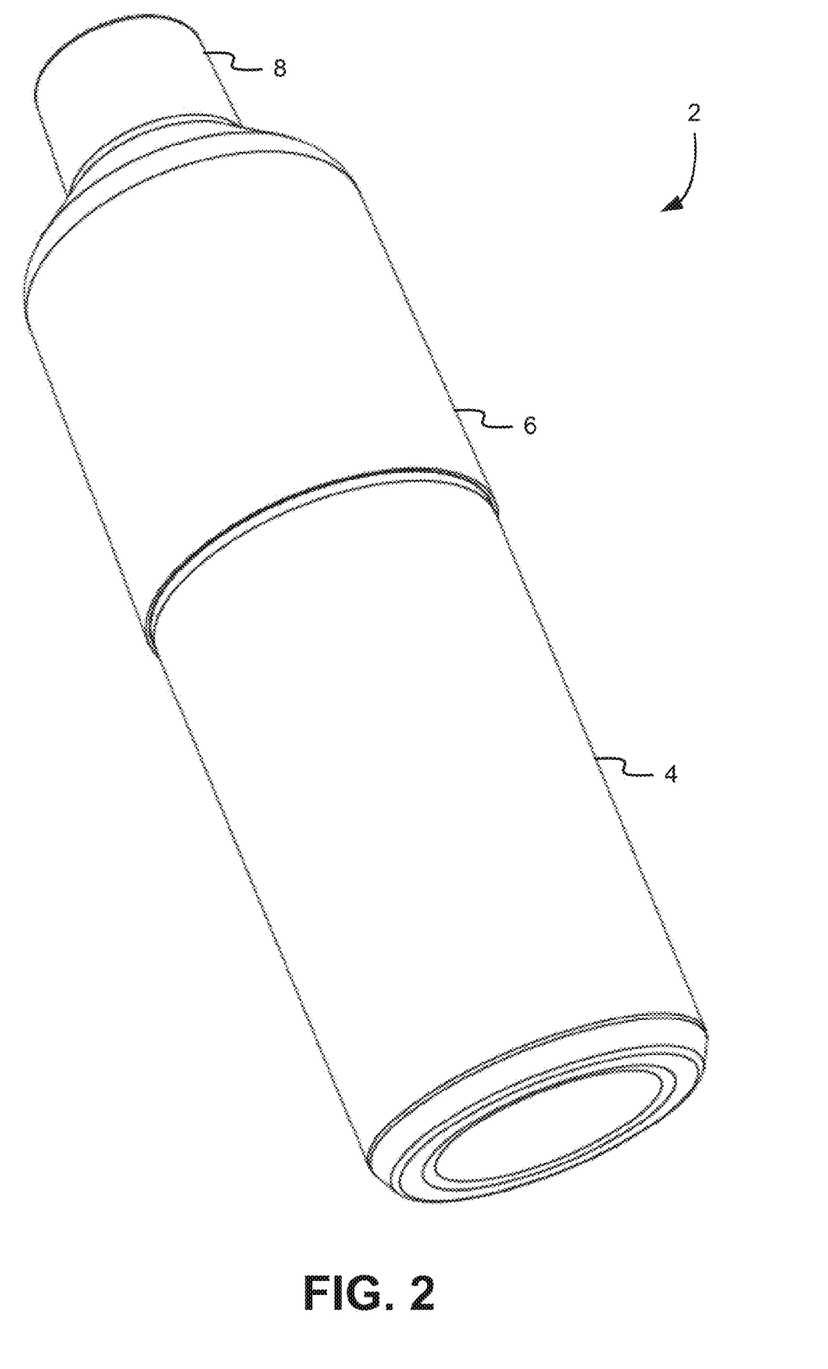
FIG. 2 shows a bottom perspective view of the shaker of FIG. 1, in accordance with an embodiment.
Figure 3:
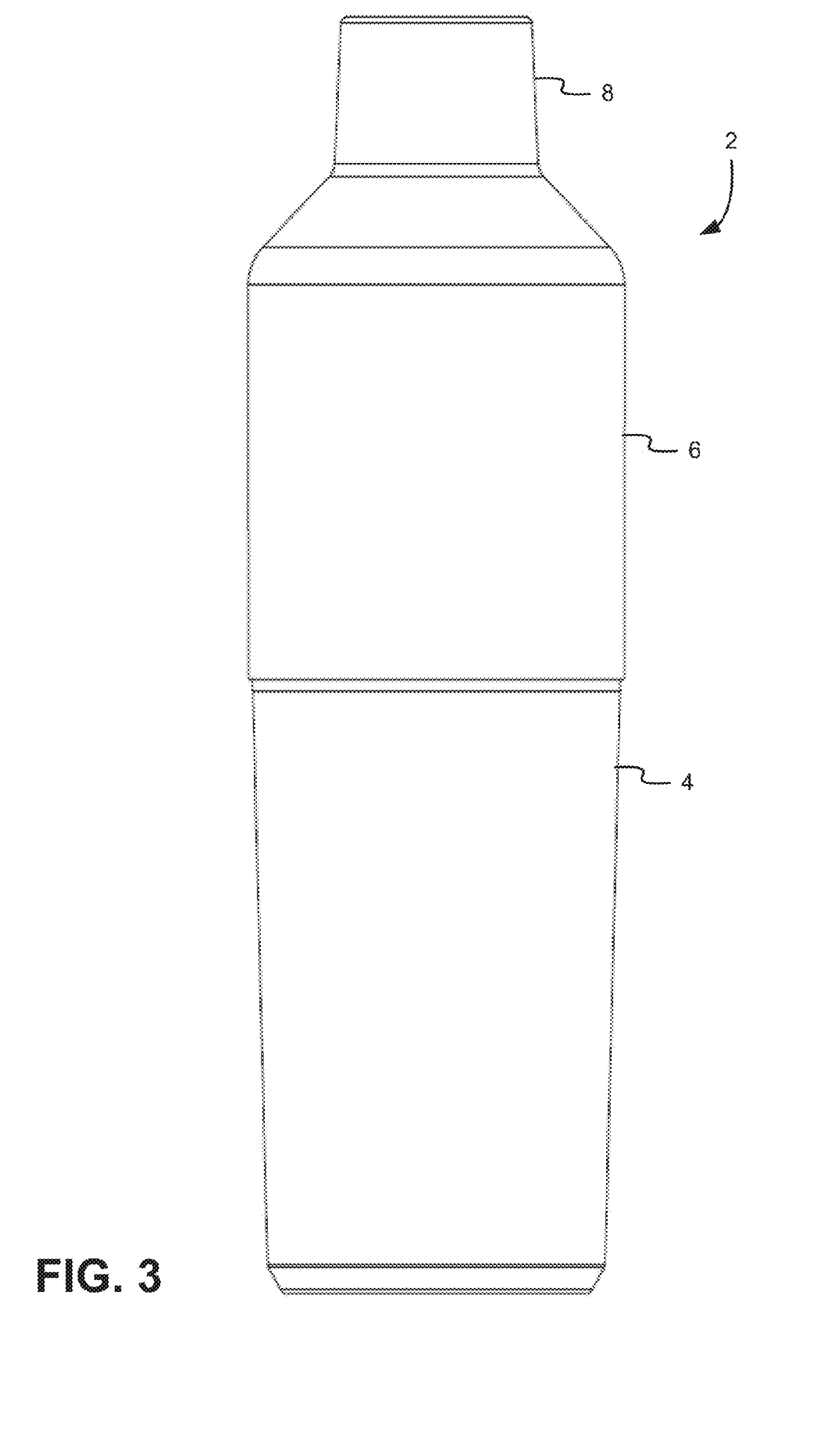
FIG. 3 shows a side view of the shaker of FIG. 1, in accordance with an embodiment.

Techniques described and suggested herein include techniques for providing mixed beverages, such as cocktails. Referring to FIG. 1, a perspective view of a cocktail shaker 2 (referred to simply as a "shaker") is shown. As illustrated in FIG. 1, the cocktail shaker 2 is configured with a shaker bottom 4 and a shaker top 6. The shaker bottom 4 (shaker base), in various examples, has a form that approximates a cylinder or a frustum of a cone having a narrower cross section oriented toward the bottom of the shaker 2. In the particular illustrative example of FIG. 1, the shaker bottom 4 has an outer form of the frustum of a cone with a base that is slighter narrower than the top. It should be noted, however, that the shaker bottom may have other forms, such as a frustum of a prism and that the scope of the present disclosure is not limited to the explicit examples provided herein.

The shaker top 6 of the shaker 2, in an embodiment, is configured with a bottom portion that is approximately the same shape as the top portion of the shaker bottom 4. In an embodiment, the bottom portion of the shaker top 6 is configured with a similar form, but slightly wider than the top portion of the shaker bottom 4 so as to receive part of the top portion of the shaker bottom 4 into the bottom portion of the shaker top 6. It may be said that the shaker bottom 4 and shaker top 6 are removably connectable with one another due to the ability to connect the shaker bottom 4 and shaker top 6 together so that the shaker bottom 4 and shaker top 6 are disconnectable from one another to access the ingredients inside to make a cocktail. In an embodiment, the shaker bottom has outer dimensions equal to or less than inner dimensions of the shaker top 6, although the shaker top 6 may have outer dimensions equal to or less than inner dimensions of the shaker top, in some examples. The interior of the shaker top 6, in an embodiment, is configured to receive a limited portion of the shaker bottom 4. For example, the contour of the interior of the shaker top 6 may be configured such that the shaker bottom 4 is insertable into the shaker top 6 only a limited distance as a result of engagement of the exterior surface of the shaker bottom 4 with the interior surface of the shaker top 6. As another example, one or more protrusions may protrude into the interior cavity formed by the shaker top 4 so as to prevent further insertion of the shaker bottom 4 into the shaker top 6. Other variations are also considered as being within the scope of the present disclosure, including variations where the shaker top is configured to be inserted into the interior cavity formed by the shaker bottom 4 a limited distance.

Figure 8:
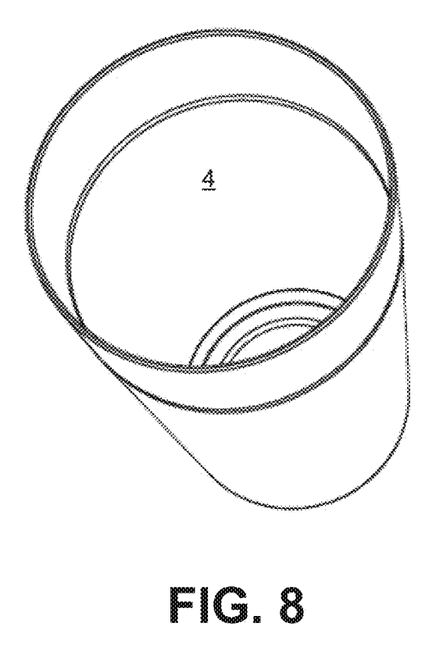
FIG. 8 shows a top perspective view of a bottom of the shaker of FIG. 1, in accordance with an embodiment.
Figure 9:
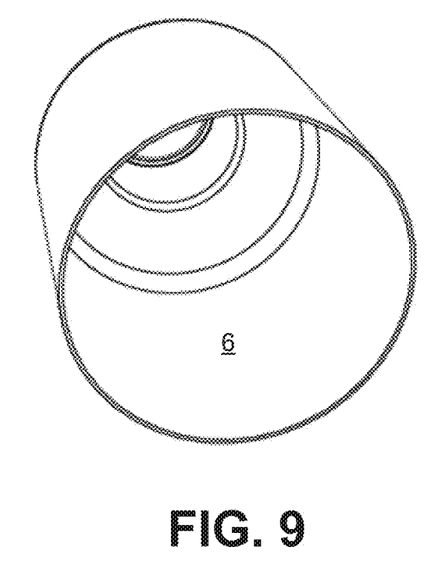
FIG. 9 shows a bottom perspective view of a top of the shaker of FIG. 1, in accordance with an embodiment.

The shaker bottom 4, a perspective view of which is shown in FIG. 8, and shaker top 6, a perspective view of which is shown in FIG. 9, may be formed from various materials and combinations of materials. In some embodiments, both the shaker bottom 4 and shaker top 6 are formed by extrusion molding and/or blow molding of polyethylene or another suitable plastic. In some embodiments, Polyethylene Terephthalate (PET) blow molding is used for the shaker top and/or shaker bottom and/or other components of the shaker. Spin trimming or other techniques may be used to form the bottom of the shaker top and/or the top of the shaker bottom. As noted below, a lip roller may be used to provide a lip to the shaker bottom and/or shaker top. In other embodiments, the shaker bottom 4 and shaker top 6 are formed from a metal, such as aluminum. Naturally occurring materials, such as coconut shells or bamboo, may also be used for some or all of the shaker bottom 4 and/or shaker top 6. As implied by the preceding text, the shaker bottom 4 and shaker top 6 may be formed from the same material or combination of materials or the shaker bottom 4 and shaker top 6 may be formed from different materials or combinations of materials. For instance, in some embodiments, the shaker bottom 4 is made from aluminum while the shaker top is made from plastic. In some embodiments, the shaker bottom 4 is formed to be disproportionately weighted at the bottom (with the same or a different material), providing the shaker bottom 4 greater stability when empty. For example, the shaker bottom 4 may be weighted such that its center of mass is below halfway from top to bottom (of the shaker bottom 4).

Figure 10:
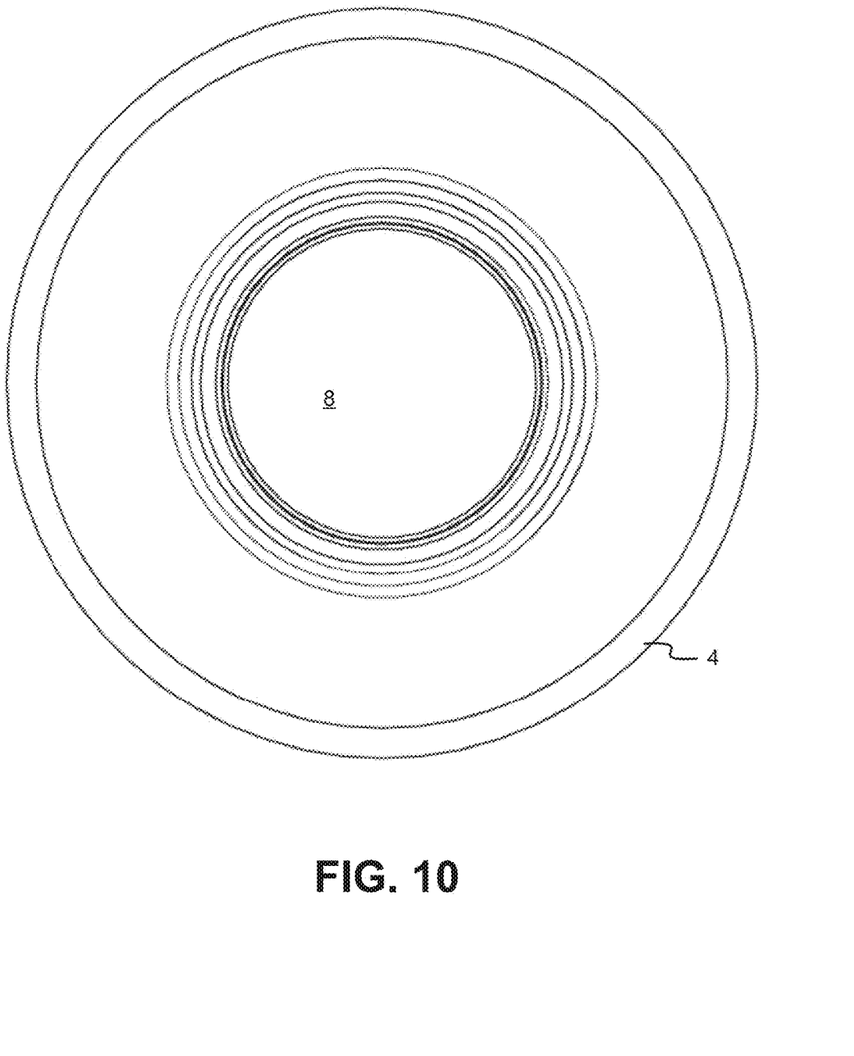
FIG. 10 shows a bottom view of the shaker of FIG. 1, in accordance with an embodiment.
Figure 11:
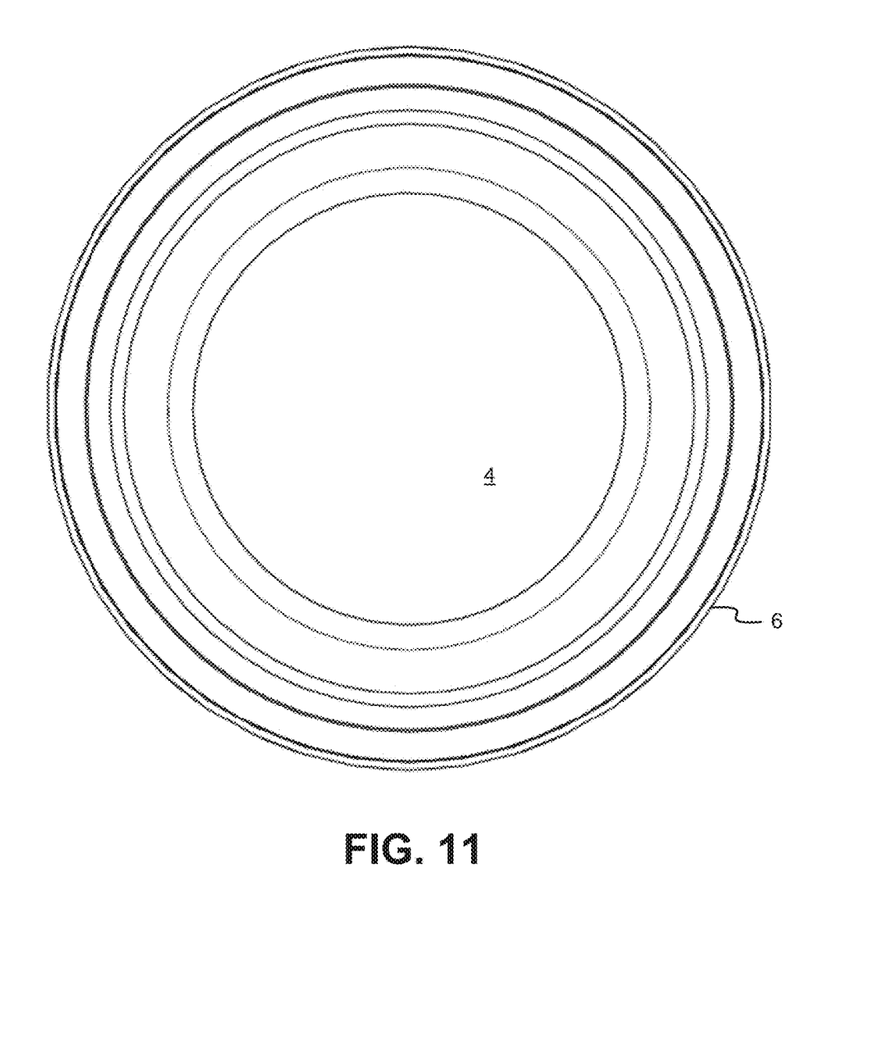
FIG. 11 shows a top view of the shaker of FIG. 1, in accordance with an embodiment.

As illustrated in FIGS. 1-5 and 10, the shaker top 6 may include a shaker cap 8 which, in an embodiment, is a top-most portion of the shaker top 6 that is shaped in the form of a cylinder or a frustum of a cone or otherwise (e.g., a dome or rectangular prism). A bottom view of the shaker 2, which includes the shaker cap 8, is shown in FIG. 10. In some embodiments, the shaker cap 8 is solely ornamental and, as a result, unable to be removed from the shaker top 6. The shaker cap 8 may, for example, be manufactured to be integral with the shaker top 6. In some embodiments, the shaker cap 8 is removable, the removal of which exposes a strainer portion of the shaker top which serves to separate liquid from larger particles (e.g., chunks and/or cubes of ice) when the shaker 2 is full and inverted.

Figure 4:
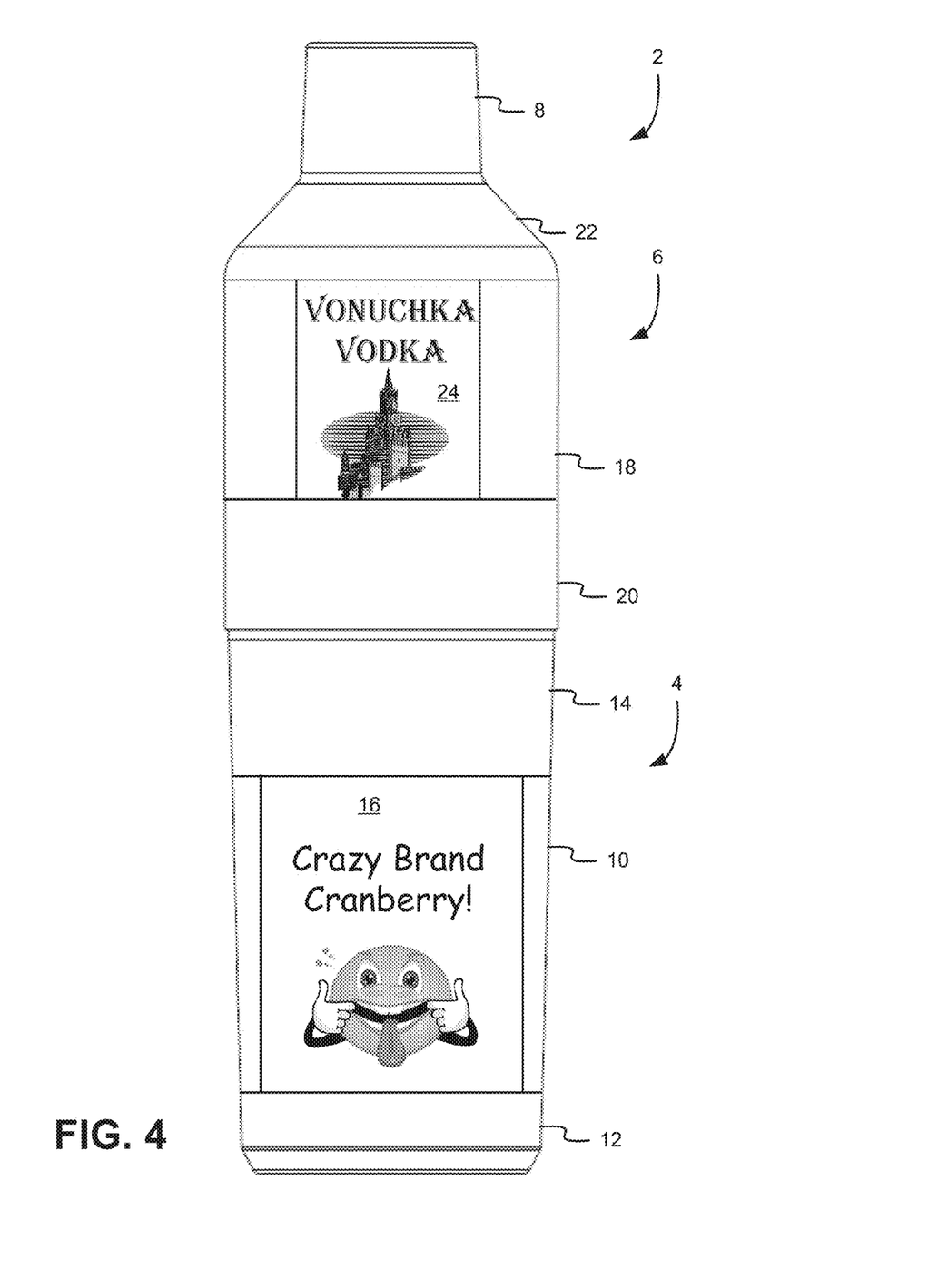
FIG. 4 shows a side view of an alternate embodiment of the shaker of FIG. 1.

In addition to variations with respect to the size and shape of the various components of the shaker 2, numerous other variations are also considered as being within the scope of the present disclosure. FIG. 4, for instance, shows an illustrative example of an embodiment of the shaker 2 where the shaker 2 is configured to display items contained in the shaker 2, such as some or all cocktail ingredients. For example, the shaker bottom 4, in some embodiments, comprises three sections, a shaker bottom transparent portion 10, a shaker bottom lower opaque portion 12 below the shaker bottom transparent portion 10, and a shaker bottom upper opaque portion 14 above the shaker bottom transparent portion 10. The shaker bottom transparent portion 10, shaker bottom lower opaque portion 12, and shaker bottom upper opaque portion 14 may be collectively arranged so that a label of a mixer container (or labels of multiple mixer containers) situated in the shaker bottom 6 is visible through the shaker bottom transparent portion 10. In this illustrative example of FIG. 4, the mixer container 16 is a can of cranberry juice, although other mixer containers may be used in various embodiments. Generally, the mixer container 16 may be a container of any ingredient usable as an ingredient for a cocktail. In an embodiment, the mixer container 16 is an aluminum can of a standard size manufactured by a beverage manufacturer. In some examples, the mixer container 16 is a 5 oz can of a carbonated beverage, such as cola, ginger ale, soda water, or tonic water. Other examples include cans of carbonated or non-carbonated energy drinks, some of which may contain 8.4 oz of beverage.

In an embodiment, the shaker bottom transparent portion 10 extends completely around the shaker bottom, thereby easing the manufacture of the shaker 2 by allowing the label of the mixer container 16 to be visible regardless of its rotational orientation relative to the shaker bottom 4, although in some embodiments, the shaker bottom transparent portion 10 extends only partially around the shaker bottom 4 and manufacture of the shaker 2 includes orienting the mixer container 16 with the shaker bottom transparent portion 10 to cause a relevant portion of the label of the mixer container 16 to align with the shaker bottom transparent portion 10.

The shaker bottom 4, when including a shaker bottom transparent portion 10, may be manufactured in various ways in accordance with various embodiments. For example, the shaker bottom 4 may be manufactured as a single, transparent piece and the exterior and/or interior of the shaker bottom may be partially coated with an opaque material (e.g., paint), leaving the shaker bottom transparent portion 10 transparent. In other embodiments, the shaker bottom transparent portion 10 is constructed separately from the shaker bottom lower opaque portion 12 and/or shaker bottom upper opaque portion 14 and subsequently connected together with a suitable adhesive or process (e.g., by heating and fusing together). In yet other embodiments, the shaker bottom 4 is constructed with a transparent material and wrapped (e.g., shrink-wrapped or coated with a label) that covers portions of the shaker bottom, leaving the shaker bottom transparent portion 10. The material used to render portions of the shaker bottom 4 opaque may cover just the shaker bottom 4 or may cover multiple portions of the shaker 2. For example, shrink wrapping techniques may be used to cover both the shaker bottom 4 and shaker top 6 with a single piece of material that is configured to leave transparent the shaker bottom transparent portion and any other portions desired to remain transparent. Further, in some examples, the shaker 2 does not show contents, but uses labeling to indicate the contents of the shaker 2 for sale. When using shrink wrap to cover portions of the shaker top and shaker bottom, the shrink wrap may include perforations configured around the shaker circumferentially at the bottom of the shaker to enable the shrink wrap to be easily torn, thereby allowing separation of the shaker top from the shaker bottom. Perforations may be configured in other ways in addition to circumferentially or instead of circumferentially. For example, shrink wrap may include vertical or other perforations that enable ripping of the shrink wrap. Other techniques and combinations of techniques are also considered as being within the scope of the present disclosure.

As illustrated in FIG. 4, the shaker 4 may also be configured to display one or more spirit containers enclosed in the shaker 2. As illustrated in FIG. 4, the shaker top 6 comprises a shaker top transparent portion 18, a shaker top lower opaque portion 20, and a shaker top upper opaque portion 22, where the shaker top transparent portion 18, in an embodiment, is situated between the shaker top lower opaque portion 20 and the shaker top upper opaque portion 22. Numerous variations in how the shaker top 6 is constructed to provide the shaker top transparent portion 18 and how the shaker top transparent portion 18 is configured, including, but not limited to, variations discussed above in connection with the shaker bottom 4, are considered as being within the scope of the present disclosure. As illustrated in the example of FIG. 4, the shaker top transparent portion 18 is configured so that, from the outside of the shaker 2, a label of a spirit container 24 is visible through the shaker top 6. In this example, the spirit container 24 contains vodka, although other spirits are also considered as being within the scope of the present disclosure. In an embodiment, the spirit container 24 is a small bottle containing one serving of the liquid inside which, as an example, may be 50 ml or one ounce or another volume considered to be a serving. In some embodiments, the volume of liquid in the spirit container 24 is greater than sufficient for a particular cocktail, such as when the spirit container 24 is a standard-size bottle of liquid manufactured by a distiller, but where a cocktail does not require a complete serving.

Figure 5:
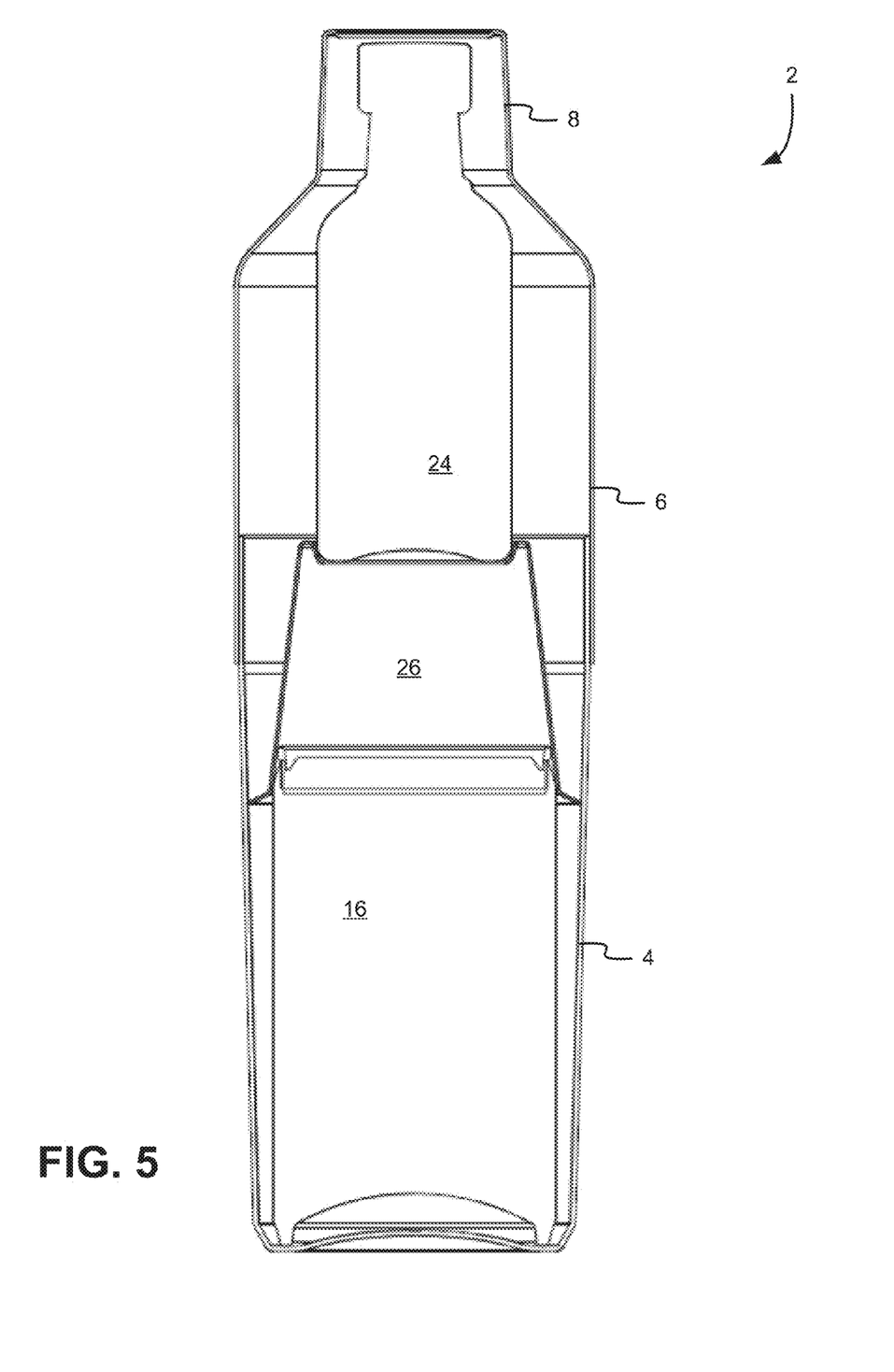
FIG. 5 shows a cutaway view of the shaker of FIG. 1 in accordance with an embodiment.

FIG. 5 shows a cut-away view of the shaker 2 which illustrates how various components of the shaker may be arranged in accordance with some embodiments. In this example, the interior of the shaker 2 is configured to securely hold a mixer container 16 and spirit container 24. As illustrated in FIG. 5, the mixer container 16 is a can situated upright in an interior cavity of the shaker bottom 4. In this example, the outer dimensions of the mixer container 16 are configured to be slightly smaller than the respective inner dimensions of the shaker bottom 4 so that, when in the shaker 2, the mixer container 16 has limited or no ability to laterally move within the shaker 2 (when the shaker 2 is oriented in an upright manner, such as illustrated in FIG. 5). While this example shows the mixer container 16 nesting snugly within the shaker bottom 4, other techniques may be used. For example, in some embodiments, a set of protrusions (e.g., three protrusions evenly spaced inside of the shaker bottom 4) inside of the shaker bottom 4 may be configured to limit lateral movement of the mixer container 16 while providing additional room between the mixer container 16 and the interior walls of the shaker bottom 4, which may be used for other purposes, such as additional ingredients, such as for one or more packets of sugar, salt, simple syrup, lemon juice, lime juice, bitters, spirit containers for which less than a shot is required and/or other ingredients requiring substantially less volume than the mixer container 16.

As illustrated in FIG. 5, the shaker 2 may include a spacer 26 that separates the mixer container 16 from the spirit container 24, although the spirit container 24 may be situated directly on top of the mixer container in some embodiments. In this example, the spacer 26 is configured with multiple features enhancing performance of the shaker 2. In an embodiment, the shaker 26 is configured to approximate a hollow frustum of a cone, although spacers considered as being within the scope of the present disclosure are not necessarily hollow. In some embodiments, the spacer 26 is hollow and used for storage of one or more ingredients requiring less volume than the spirit container 24 and mixer container 16, such as one or more ingredients discussed above. In an embodiment, the spacer 26 is vertically dimensioned so that the combination of the mixer container 16, spacer 26, and spirit container 24, when stacked in that order, have a collective height approximately equal to (e.g., equal to or slightly less than) the interior length of the shaker 2 when the shaker 2 is constructed and the shaker bottom 4 and shaker 6 top are engaged with one another. Further, in an embodiment, as illustrated in FIG. 5, the spacer 26 is configured to enable the spirit container 24 to securely sit atop the spacer 26 between the spacer 26 and the shaker cap 8. In some embodiments, differently sized spacers are used for respective different mixer container/spirit container combinations so that the same shaker bottom 4 and shaker top 6 are usable with different mixer container/spirit container combinations, thereby allowing for a single manufacturing run of shaker bottoms and shaker tops to accommodate multiple different types of cocktails. However, as discussed in more detail below, a single spacer may enable use of different mixer container/spirit container combinations.

Figure 6:
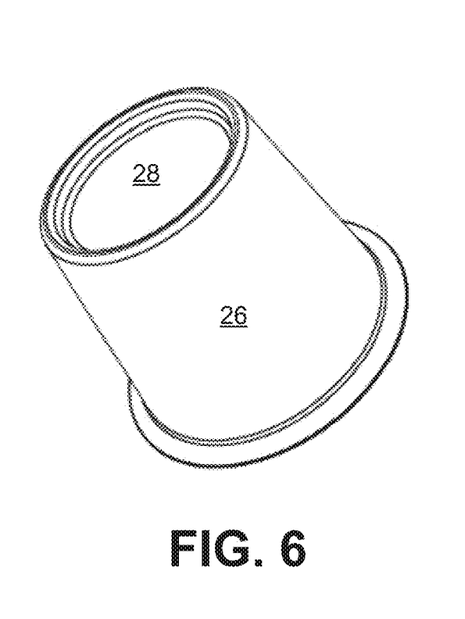
FIG. 6 shows a top perspective view of a spacer used in the shaker of FIG. 1, in accordance with an embodiment.

Referring to FIG. 6, which shows an illustrative example of the spacer 26, the spacer 26 is configured with an indented top surface 28 surrounded by a lip which, as illustrated in FIG. 5, serves to secure a bottom of the spirit container 24 and prevent the bottom of the spirit container 24 from moving laterally. In the example of FIG. 6, the indented top surface is circular to match the profile of a circular bottle (i.e., a bottle with a circular profile when viewed from underneath), although the indented surface 28 may be square, rectangular, or otherwise shaped to match other bottle profiles. Generally, the spacer 26 may be configured to engage and prevent at least some lateral movement of the spirit container 24 so that the spirit container 24 remains in approximately the same orientation despite agitation caused by shipping and other movement of the shaker 2. Further assisting to achieve this goal, as illustrated in FIG. 5, the shaker top 6 is configured in some embodiments so that a neck of the spirit container 24 protrudes into the interior of the shaker cap 8 so that the shaker cap 8 prevents at least some lateral movement of the spirit container 24. In this manner, the spacer 26 and shaker cap 8 collectively prevent movement of the spirit container 24 and changes to its orientation. Friction, labels, and/or shrink wrap may prevent the shaker bottom 4 and shaker top 6 from moving relative to one another, thereby keeping the mixer container 16 and spirit container 24 in a desired orientation/position until the shaker 2 is opened.

Figure 7:
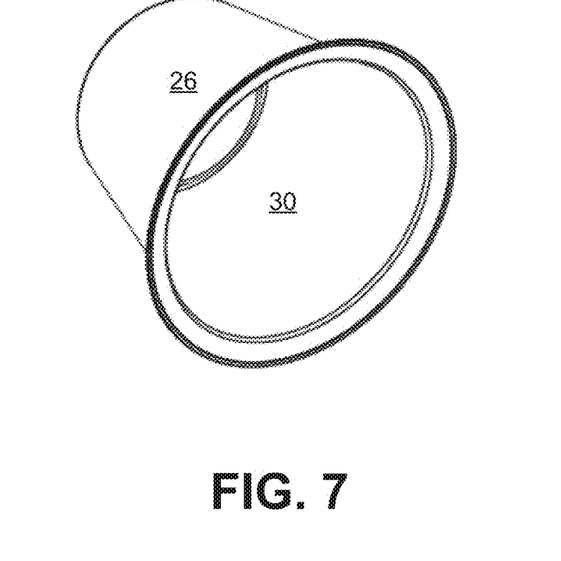
FIG. 7 shows a bottom perspective view of a spacer used in the shaker of FIG. 1, in accordance with an embodiment.

Referring to FIG. 7, the spacer 26 may also be configured to have desired properties relating to the mixer container 16. For example, an interior 30 of the spacer 26 may be dimensioned to receive and engage a top portion of the mixer container 16. A manner in which the spacer 26 and mixer container 16 may engage each other is illustrated in FIG. 5. In this example, moving from bottom to top, the interior 30 of the spacer 26 decreases in size so that the mixer container is insertable partially, into the interior 20. As with other components of the shaker 2, protrusions or other features may be used in addition or alternatively. Also illustrated in FIG. 5, the spacer 26 may be flared at the bottom so that an outer edge of the spacer 26 engages an interior of the shaker bottom 4 and/or prevents at least some lateral movement of the spacer 26 within the shaker bottom 4.

Numerous variations and enhancements of the above are considered as being within the scope of the present disclosure. For example, cocktails have a wide range of ingredients where the mixers, the spirits, and/or other ingredients vary. Numerous variations of the present disclosure allow for variations in the cocktails that are available. For example, the illustrated embodiments show a shaker 2 containing a single mixer container 16 and a single spirit container 24. Some cocktails may require multiple spirits. As a result, the form of the shaker top 6 may be adapted to securely contain two or more spirit containers, such as two spirit containers upright side-by-side, three spirit containers arranged upright in a triangle configuration, four spirit containers upright in a rectangular configuration, multiple spirit containers stacked on their size, combinations of the above, and/or other variations. Similar adaptations may be made in alternative or in combination to enable the inclusion of multiple mixer containers within the shaker bottom 4 or generally within the shaker 2. Further, while illustrated embodiments show an orientation with a spirit container 24 on top of a mixer container 16, other configurations are considered within the scope of the present disclosure, such as embodiments where one or more mixer containers are atop one or more spirit containers. Internal structure of the shaker bottom 4 and shaker top 6 may be configured accordingly to achieve effects discussed above, such as preventing vertical and/or lateral movement of some or all ingredients inside of the shaker 2.

Other enhancements may also be made to accommodate variations in sizes of mixer containers 16 and spirit containers 24. For example, with respect to mixer containers, mixer containers may be manufactured in a variety of sizes. In some examples, a first mixer container may be shorter but wider than a second mixer container. In some embodiments, the shaker bottom is configured so that, regardless of which mixer container is in the shaker bottom, the top of the mixer container is at the same height. The shaker bottom 4 may have one or more structures (protrusions, rings, etc.) situated on or near an internal perimeter of the shaker bottom that raises the shorter but wider mixer container, but that leaves enough space in a central region of the shaker bottom 4 so as to not have the raising effect on the thinner but taller mixer container. In this manner, the same shaker bottom 4 may be used for multiple different types of cocktails, thereby creating manufacturing efficiencies by reducing the different types of shaker bottoms that need to be manufactured. As another example, multiple such structures may be utilized to accommodate more than two types of mixer container, further enhancing the technical advantages with respect to manufacturing efficiency.

Similar enhancements may be made to the spacer 26 (in embodiments where included) to accommodate multiple different size mixer containers and/or multiple different size spirit containers. For example, referring to the first mixer container and second mixer container of the previous paragraph, the interior portion of the spacer 26 may be configured such that the second mixer container is insertable further into the interior of the spacer 26 than the first mixer container (if the first mixer container is insertable at all) such that, regardless of whether the spacer is used with the first mixer container of the second mixer container the top surface of the spacer 26 is at the same or approximately the same height. The spacer may be contoured and/or configured with internal structures (e.g., protrusions) to achieve this effect. Generally, the spacer 26 may be configured such that the assembled combination of mixer container, spacer, and spirit container has the same or approximately the same height for different mixer container/spirit container combinations so that the combinations fit securely inside of the shaker 2. Variations in the interior of the shaker top 6 (e.g., inside of the space enclosed by the shaker cap 8), such as variations discussed above in connection with the spacer 26 and/or shaker bottom 4, may also be incorporated into the shaker top to accommodate variations in the tops of spirit containers and/or other containers (e.g., mixer containers when so configured) contained within shaker tops 6.

Other variations are also considered as being within the scope of the present disclosure. For example, in some embodiments the shaker bottom 4 and/or shaker top 6 are configured to enable the passage of air from outside of the shaker 2 into the shaker 2 to reduce the difficulty of separating the shaker bottom 4 from the shaker top 6 caused by the vacuum being created by the separation. In some embodiments, the shaker top 6 has a hole enabling the passage of air and the hole may be covered by shrink wrap or other packaging until the shaker 2 is opened and used. If so equipped, the holes may be in a strainer covered by a removable cap, although one or more holes may appear in other portions of the shaker top 6. The shaker bottom 4 may also have a hole in addition or as an alternative. In other embodiments, the shaker top and/or bottom are configured such that there is a channel allowing air to pass by a portion where the shaker top 6 and shaker bottom 4 overlap when the shaker 2 is assembled. In yet other examples, the shaker top and/or bottom is configured with a one-way valve that enables air to pass into the shaker 2 when the shaker top 6 is separated from the shaker bottom 4 and the air pressure inside of the shaker 2 is thereby lowered. Other variations are also within the scope of the present disclosure.

A shaker 2 such as discussed above may be manufactured by mechanical equipment that assembles the ingredients and shaker parts together, such as illustrated in the figures. The shaker bottom 4 and shaker top 6 may be sealed with shrink wrap or otherwise to maintain the shaker 2 in an assembled state until intended to be used. As noted, other mechanisms may be used to maintain the shaker 2 in an assembled configuration. An adhesive label, for example, may be removable to enable the shaker 2 to be disassembled. In some embodiments, the shaker is wrapped with paper and/or plastic packaging with a pull tab that, when pulled, rips the packaging in an appropriate position to enable disassembly of the shaker 2 (i.e., by separation of the shaker bottom 4 from the shaker top 6). In some embodiments, the shaker bottom 4 and shaker top 6 are configured to interlock with one another so that, for instance, disassembly involves twisting the shaker bottom 4 relative to the shaker top 6 before and/or while pulling the shaker bottom 4 from the shaker top 6.

Other notable variations considered as being within the scope of the present disclosure involve the ingredients of the cocktails preparable using a shaker 2. In the above examples, the mixer container 16 and spirit container 24 each are formed from rigid materials (e.g., an aluminum can and glass or plastic bottle for the mixer container and spirit container, respectively). One or more of the mixer containers and/or spirit containers may be made from a flexible material, such as in pouch form or using Tetra-Pak technology. In some embodiment, such as when the bottom ingredient is in highly flexible packing, the spacer may rest on a structure inside of the shaker bottom to prevent movement of the spacer and, therefore, movement of the top ingredient. Also, as noted, some cocktails may have more than two ingredients and some ingredients may have rigid packaging and some ingredients may have flexible packaging.

Other variations include variations where the shaker bottom is the mixer container itself and there is no separate shaker bottom. For a shaker, the shaker top and/or spacer (if equipped with a spacer) may be configured such that the spirit container sits atop the mixer container and such that, when assembled, the shaker resembles a cocktail shaker. The spirit from the spirit container may be added to the mixer container, in such embodiments, and the mixer container may be configured with enough empty volume to receive enough of the spirit to make a cocktail (or a person may simply drink or pour some mixer out to make room for the spirit). Other additional items may be included with or in the shaker 2. Such additional items include edible or non-edible garnishes, toothpicks, straws, sticks or other items used for stirring, paper umbrellas and the like. In some embodiments, a separate container for drinking is provided to be used instead of the shaker bottom 4 or shaker top 6. As an illustrative example, a plastic or other-materials container may be included in the shaker bottom 4 or shaker top 6 and the mixer container and/or spirit containers may be situated in the container. The container may resemble a specific type of cocktail glass, such as a martini glass, a highball glass or another glass. In some embodiments, the spacer 26 may be used as a container and may have structure that enables attachment to a stem also included in or otherwise with the shaker 2.

In some embodiments, the shaker 2 is provided with an instant cold pack (e.g., package with mixable chemicals that, when mixed, cause an endothermic reaction) that enables cooling of liquids in the shaker 2 for embodiments where, for instance, the shaker 2 is provided for sale in an unrefrigerated location. In some embodiments, the cold pack is sturdily constructed to avoid mixing of the cold pack chemicals with the ingredients of the cocktail. In some embodiments, the shaker bottom is constructed to prevent beverages from touching the cold pack. As an illustrative example, the shaker bottom may have internal structure that forms a compartment in which the cold pack may be placed when activated, where the compartment isolates the cold pack from another compartment where the mixed beverage is located (after mixing). In some embodiments, the shaker 2 is provided with instructions to use the cold pack to cool the mixer (s) and/or spirit (s) prior to opening the mixer container(s) and/or spirit container(s) so that there is no contamination.

In some embodiments, no mixer container is included in the shaker 2, such as when cocktails do not require a non-alcoholic mixer container. As an example, the shaker bottom 2 may contain a martini glass made from plastic or another material and the shaker top 2 may contain a sufficient quantity (e.g., two small bottles) of vodka or gin with a small packet of vermouth. A spacer atop the martini glass may be used to enable secure storage of the vodka/gin within the shaker top 6, such as described above. A cold pack may also be included to cool the spirit container (and, therefore, its contents) prior to pouring into the martini glass. In some embodiments, the shaker 2 contains a stem for a glass (e.g., resembling a stem of a martini or wine glass) that is attachable to a structure on the cap 8 or on the shaker bottom 4 underside to cause the shaker top 6 or shaker bottom 4 to serve as a stemmed glass. The structure may be a threaded cavity configured to receive the stem in a screwing motion or may be configured so that the stem snaps into place or is held into place by friction. The stem may be a unitary piece or may be constructed from parts provided in/with the shaker 2. In some embodiments, the spacer 26 serves as a base for a stem attached to the shaker top 6 or shaker bottom 4. The spacer 26, in this example, may attach to a leg of a stem using friction, threading, snapping mechanism or otherwise. Other variations are also considered as being within the scope of the present disclosure.

Returning to the illustrated embodiments, a shaker 2 such as described above may be used to sell ingredients that purchasers can use to construct their cocktails in a convenient manner. In particular, a purchaser (or other acquirer of a shaker 2) may obtain the shaker, separate the shaker bottom 4 from the shaker top 6, obtain the ingredients contained therein, mix the ingredients, and enjoy the resulting cocktail. In some embodiments, the ingredients are mixed in the shaker bottom and the shaker bottom 4 is used as a glass. To mix, in some embodiments, a person may rejoin the shaker bottom 4 to the shaker top 6 (possibly with a shaker cap, if equipped with a separate cap) and may shake the shaker 2, thereby mixing the ingredients for enjoyment. In some embodiments, the shaker bottom 4 can be again removed from the shaker top 6 and the shaker bottom 4 can be used as a glass from which to drink the resulting cocktail. In alternate embodiments, the shaker top 6 or another container can be used to enjoy the cocktail. In various embodiments, the component of the shaker 2 used to enjoy the cocktail contains sufficient volume for the cocktail and may include additional structure to aid enjoyment. For example, the component may have a lipped ridge, as with many disposable cups, to avoid the sensation of a rough edge on a person's lips when drinking the cocktail. A lipped ridge may be formed, for instance, using a lip roller when manufacturing the shaker. In embodiments with a lipped ridge on the shaker bottom, the interior of the shaker top may be configured with a channel configured to receive the lipped ridge, thereby mechanically securing the shaker top to the shaker bottom until separated by a user pulling the shaker top and shaker bottom apart. Other variations include variations where one or more ingredients are included in a shaker without a separate respective container. For example, a shaker bottom (and/or top) may contain a mixer that is not in a separate container (i.e., other than the shaker bottom). The shaker bottom (and/or top) may be sealed to prevent bacterial and/or other contamination. To mix a cocktail, the shaker bottom (and/or top) may be unsealed to access the ingredients.

As implied above, in various embodiments, a shaker considered as being within the scope of the present disclosure lacks a spacer. In such embodiments, the shaker top and shaker bottom may be dimensioned such that, the interior vertical height of the assembled shaker approximates (but is greater than or equal to) that of the sum of the spirit container and mixer container and, generally, the sum of the heights of stacked ingredients inside of the shaker. In this manner, the ingredients are prevented from movement in a vertical direction and external features of the ingredients (e.g., lips, ridges, and the like) prevent relative horizontal movement. Additional structure may be included inside of the shaker. For example, in some embodiments, a glue dot (e.g., a small amount of rubber cement or other elastic or inelastic adhesive structure) may be situated between the top of the spirit container and the underside of the top of the shaker cap, thereby securing the spirit container inside of the shaker top, preventing the spirit container from moving vertically and/or horizontally. A glue dot or other adhesive structure may also be utilized below the mixer container and/or between the mixer container and the spirit container. Adhesives used for the glue dot or otherwise may be food grade.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together with, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A shaker, comprising:
   a shaker bottom; and
   a shaker top removably connectable to the shaker bottom to enclose an interior volume for storage of a plurality of containers that each contain a different beverage ingredient and that each have a different shape, the shaker top configured such that:
      the shaker top is disconnectable from the shaker bottom to access the plurality of containers; and
      the shaker bottom is able to receive a respective beverage ingredient from each container of the plurality of containers to form a cocktail, wherein:
         the plurality of containers comprises a first container having a first top surface and a second container having a second top surface, the second top surface being smaller in area than the first top surface;
         the shaker bottom and the shaker top are collectively configured to restrict lateral movement of both the first container and the second container;
         the shaker bottom is configured to hold the first container and the second container in a fixed orientation relative to one another;
         the first container has a label; and
         the shaker has a transparent portion and an opaque portion, the transparent portion located to allow for visibility of the label from outside of the shaker.

2. The shaker of claim 1, wherein the shaker bottom and the shaker top are collectively configured to restrict vertical movement of at least one container of the plurality of containers.

3. The shaker of claim 1, wherein the shaker bottom and the shaker top are collectively configured to restrict both vertical and horizontal movement of the plurality of containers.

4. The shaker of claim 1, further comprising the plurality of containers.

5. The shaker of claim 1, further comprising a spacer configured to vertically separate the first container from the second container from the plurality of containers and wherein the second container has a bottom surface that is smaller in area than the first top surface.

6. The shaker of claim 1, wherein the shaker bottom is at least partially transparent to allow for visibility, from outside of the shaker, of at least one container of the plurality of containers inside of the shaker.

7. The shaker of claim 1, wherein the shaker top is at least partially transparent to allow for visibility, from outside of the shaker, of at least one container of the plurality of containers inside of the shaker.

8. The shaker of claim 1, wherein the shaker top and the shaker bottom are each partially transparent to allow for visibility, from outside of the shaker, of at least one respective container of the plurality of containers.

9. The shaker of claim 1, wherein the shaker top and the shaker bottom are both constructed from plastic.

10. The shaker of claim 1, further comprising packaging material that secures the shaker bottom to the shaker top.

11. The shaker of claim 1, wherein the shaker bottom comprises the transparent portion and an opaque portion.

12. A shaker, comprising:
    a shaker bottom; and
    a shaker top removably connectable to the shaker bottom to enclose an interior volume for storage of a plurality of containers that each contain a different beverage ingredient and that each have a different shape, the shaker top configured such that:
       the shaker top is disconnectable from the shaker bottom to access the plurality of containers; and the shaker bottom is able to receive a respective beverage ingredient from each container of the plurality of containers to form a cocktail, wherein:

the shaker top is configured to maintain a first container of the plurality of containers in a fixed orientation;

the first container has a label; and the shaker has a transparent portion and an opaque portion, the transparent portion located to allow for visibility of the label from outside of the shaker.

13. The shaker of claim 12, wherein the shaker top comprises the transparent portion.

14. A shaker, comprising:

a shaker bottom; and a shaker top removably connectable to the shaker bottom to enclose an interior volume for storage of a plurality of containers that each contain a different beverage ingredient and that each have a different shape, the shaker top configured such that:

the shaker top is disconnectable from the shaker bottom to access the plurality of containers; and the shaker bottom is able to receive a respective beverage ingredient from each container of the plurality of containers to form a cocktail, wherein:

the plurality of containers comprises a first container and a second container;

the first container has a first label and the second container has a second label;

the shaker bottom has a first opaque portion and a first transparent portion, the first transparent portion located to allow for visibility of the first label from outside of the shaker; and the shaker top has a second opaque portion and a second transparent portion, the second transparent portion located to allow for visibility of the second label from outside of the shaker.

15. The shaker of claim 14, wherein the first opaque portion and the second opaque portion are each constructed by removable packaging of the shaker that secures the shaker top to the shaker bottom.

16. A shaker, comprising:

a shaker bottom; and a shaker top removably connectable to the shaker bottom to enclose an interior volume for storage of a plurality of containers, including a first container and a second container, that each contain a different beverage ingredient and that each have a different shape, the shaker top configured such that:

the shaker top is disconnectable from the shaker bottom to access the plurality of containers; and the shaker bottom is able to receive a respective beverage ingredient from each container of the plurality of containers to form a cocktail, wherein:

the shaker comprises the plurality of containers;

the first container comprises a mixer and the second container comprises a spirit;

the shaker comprises a spacer; and the shaker bottom and shaker top are collectively configured such that, when the shaker is in an upright orientation, the first container sits in an upright orientation at least partially inside of the shaker bottom, the spacer sits atop the first container, and the second container sits atop the spacer at least partially inside of the shaker top.

* * * * *